(12) United States Patent
Shetty et al.

(10) Patent No.: US 11,263,392 B1
(45) Date of Patent: Mar. 1, 2022

(54) PROVIDING USER-SPECIFIC PREVIEWS WITHIN TEXT

(71) Applicant: VMWARE, INC., Palo Alto, CA (US)

(72) Inventors: Rohit Pradeep Shetty, Bangalore (IN); Erich Peter Stuntebeck, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/197,094

(22) Filed: Mar. 10, 2021

(30) Foreign Application Priority Data

Jan. 12, 2021 (IN) .............................. 202141001401

(51) Int. Cl.
| | |
|---|---|
| *G06F 40/169* | (2020.01) |
| *G06F 40/106* | (2020.01) |
| *G06N 20/00* | (2019.01) |
| *G06F 16/9035* | (2019.01) |
| *H04L 29/08* | (2006.01) |
| *H04L 67/50* | (2022.01) |

(52) U.S. Cl.
CPC ........ *G06F 40/169* (2020.01); *G06F 16/9035* (2019.01); *G06F 40/106* (2020.01); *G06N 20/00* (2019.01); *H04L 67/22* (2013.01)

(58) Field of Classification Search
CPC .. G06F 40/169; G06F 16/9035; G06F 40/106; G06N 20/00; H04L 67/22
See application file for complete search history.

(56) References Cited

U.S. PATENT DOCUMENTS

| | | | | |
|---|---|---|---|---|
| 5,359,514 | A * | 10/1994 | Manthuruthil | G06F 40/247 704/10 |
| 8,477,109 | B1 * | 7/2013 | Freed | G06F 3/04842 345/173 |
| 2017/0344530 | A1* | 11/2017 | Krasadakis | G06F 40/47 |
| 2020/0065385 | A1* | 2/2020 | Dreher | G06F 40/30 |
| 2020/0175111 | A1* | 6/2020 | Zhang | G06F 40/242 |

\* cited by examiner

*Primary Examiner* — Asher D Kells
(74) *Attorney, Agent, or Firm* — Clayton, McKay & Bailey, PC (57) ABSTRACT

Examples described herein include systems and methods for providing user-specific previews for terms within text. An example method can include receiving tracked user behavior reflecting terms selected by a user and entered into a search. A representation of known words can be created based on the tracked user behavior. By training machine-learning models for each individual user, personalized previews can be presented when each user encounters a new body of text, such as in a webpage or email. The preview can apply to a term not previously known to the user but likely to be searched by the user, relying on content gathered from a search on a search medium that the user was likely to use. The content can be presented to the user in a graphical user interface allowing for interaction and feedback.

20 Claims, 5 Drawing Sheets

PROVIDING USER-SPECIFIC PREVIEWS WITHIN TEXT

RELATED APPLICATIONS

Benefit is claimed under 35 U.S.C. 119(a)-(d) to Foreign Application Serial No. 202141001401 filed in India entitled "PROVIDING USER-SPECIFIC PREVIEWS WITHIN TEXT", on Jan. 12, 2021, by VMware, Inc., which is herein incorporated in its entirety by reference for all purposes.

BACKGROUND

As a user reads text on their computing device, such as while surfing the web or reading an email, he or she comes across unfamiliar terms. The unfamiliar term could be a person's name, a technical term, or just a word that the user is unfamiliar with. To find more information about these terms, the user will commonly perform a separate web search for the term.

Previously, in order to find more information about a term, a user needed to select the term, copy it, paste it into a search engine, and perform a search. Perhaps based on the prevalence of this practice, modern web browsers provide a menu option to perform a web search based on a selected portion of text on a web page. However, even this process requires the user to manually select the text and navigate the menu options. And it still results in the user being navigated to a separate webpage. This can disrupt a user's workflow, especially where the user is utilizing an application and The search function often requires using a separate web browser. Further, if a user is utilizing an internal enterprise application, a general web search may be insufficient for a term of interest—instead, the user may need to search an enterprise system such as a backend service to obtain relevant information. Existing solutions do not adequately address these drawbacks.

In addition to addressing these drawbacks, a useful solution could also provide personalized results for each user. While some websites provide previews for terms within text, those previews are static. That is, each user that visits the website is presented with the same previews for the same terms, without regard to the particular user's past behavior. An efficient solution could present personalized results for each user, such that the terms selected for preview, as well as the content of the preview, is specific to the user.

As a result, a need exists for systems and methods for providing user-specific preview for terms within text, as described herein.

SUMMARY

Examples described herein include systems and methods for providing user-specific previews for terms within text. An example method can include tracking user search behavior, including terms selected by the user from a body of text and entered into a search. As used herein, "term" can refer to a word or group of words, without limitation. The tracking of user search behavior can include terms that a user searches using a built-in search functionality of a web browser. The user's behavior can be tracked across a variety of applications, including browsers, email applications, text editing applications, and content repository applications. The method can include receiving the tracked user behavior, either at the user's own device or elsewhere, such as a remote server.

The example method can also include storing a representation of known terms previously searched by the user or that frequently appear to the user. An example form of this representation is the bag-of-words model, a simplifying representation used in natural language processing and information retrieval. The bag-of-words model transforms text into a bag of its words, disregarding grammar, word order, and stop words (words commonly filtered out before processing text, such as "the") but retaining multiplicity. The representation can therefore include information indicating how frequently a user views a particular word in text presented to the user.

Additionally, the representation can include information regarding which words a user has searched in the past. For example, the representation can include information about the specific words that the user selected and searched, the search engine used to search each of those words, and the source of the text, such as the particular website, application, or document in which the words appeared. This information can be used in future steps to avoid showing the user information about a word that is already familiar to the user and to select personalized content for the user. The representation can be stored at the user device or at a separate server, or both, depending on the example.

The example method can also include categorizing the information included in the stored representation. For example, a term can be categorized based on its characteristics, such as by classifying a term as one or more of "technical," "non-technical," "slang," "computing," "manufacturing," "literary," "political," "obscure," or "trending." The source of the text containing the term can also be categorized. For example, if a term appeared on a website, the source website can be categorized as one or more of "technical," "non-technical," "news," "computing," "social," or "humor." Similarly, the search medium utilized by the user to search for a term can be categorized as well. Examples include "mainstream search engines," "ad-free search engines," "technical search engines," and "niche search engines." These categories are merely provided as examples; additional or alternative categories could be used, such as by being customized by an administrator.

The example method can also include training a machine-learning ("ML") model, either at the user device or at a separate server. The ML model can be trained using the tracked user behavior as training data. In some examples, the categorized terms, sources, and search mediums can also be used as training data. The ML model can therefore be trained to recognize patterns among the types of terms a user generally searches for, how those terms are initially presented to the user, and which search medium the user would utilize to search for a given type of term. In this way, an ML model can be trained for a particular user, such that each user can be associated with a different, customized ML model. These trained ML models can be stored at the server or on the associated user's device.

The example method can further include parsing a new body of text encountered by a user. This can occur when a user navigates to a new webpage or opens a new email or document, for example. Parsing can include discarding stop terms and any terms matching the known terms stored in the representation of known terms. The remaining terms can be considered candidate terms in an example. The method can include filtering the candidate terms to obtain a set of terms that is below a threshold number, such as five or ten. For example, if the initial parsing results in a set of 20 terms, then the ML model can be applied to rank the terms in order of most likely to be searched by the user, and the top ten ranked terms can be selected for further use.

For each candidate term, the ML model can be applied to determine at least one search medium that the user is most likely to use to search that term. In some examples, two or three search mediums can be determined. The search medium can be different from one term to another, such that different candidate terms within the same body of text, or even the same sentence, can correspond to different search mediums.

The example method can also include searching a candidate term using the search medium, or mediums, corresponding to that term based on the ML model's output. This can include performing a search on a search engine website or on a backend server associated with a backend system. For example, the search can be conducted on an internal database in some examples. In some examples, multiple searches can be conducted for a single term, such as by performing the multiple searches across different search mediums.

The method can further include obtaining content resulting from the searching and converting it for display to the user. For example, the content can be captured as an image or it can be copied from the source location. The content can then be injected into the text containing the term, such as by injecting HTML. When the user selects the term or hovers a mouse pointer over the term, the content can be displayed in a preview window.

Based on the user's interaction with the preview window, feedback can be provided to refine the ML model. For example, if the preview window includes two tabs corresponding to two different search mediums, then the tab selected by the user can be used as feedback to the ML model with respect to that term. In some examples, the user can be prompted with a question as to the usefulness of the preview, allowing the user to provide direct feedback in that manner. ML models can therefore be continuously updated and improved over time.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
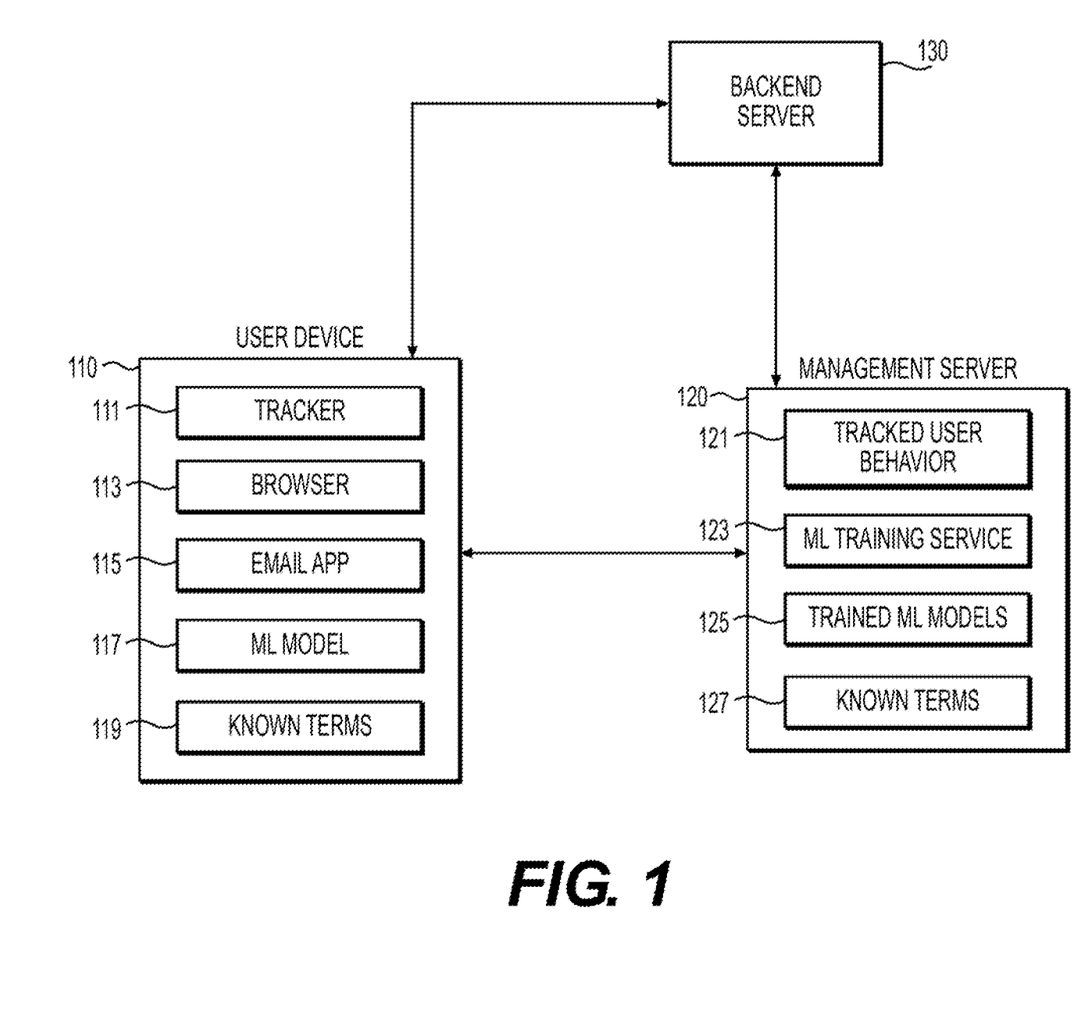
FIG. 1 is an illustration of an example system for providing user-specific previews for terms within text and for performing the methods described herein.

FIG. 1 provides an illustration of an example system for providing user-specific previews for terms within text. The system can include at least a user device 110, management server 120, and backend server 130. The user device 110 can be any type of computing device, such as a device utilizing a hardware-based processor and having a memory storage. The user device 110 can also include a display for providing user interaction. Typical examples of a user device 110 include phones, tablets, and laptop and desktop computers.

The user device 110 can include various applications that execute on the device. For example, the user device 110 can have a browser application 113 for accessing and displaying webpages. The user device 110 can also include an email application 115, such as VMWARE's BOXER, that provides access to a user's mailbox and provides email functionality to the user. The user device 110 can also include additional applications that are not shown, such as word-processing applications, productivity applications, content-viewing applications, third-party applications, and any other application that can be installed on a user device 110.

The user device 110 can also include a tracker 111, which can be a standalone tracking application in some examples. In some examples, the tracker 111 is a code wrapped into an application, such as the browser application 113 or email application 115. For example, the tracker 111 can be an agent injected into an application. The tracker 111 can communicate with the management server 120, such as by providing appropriate credentials. The tracker 111 can receive instructions from the management server 120, such as a profile that includes instructions for tracking particular applications or actions by the user.

The tracker 111 can track user behavior on the user device 110 in a variety of ways. For example, with respect to the browser application 113, the tracker 111 can store information indicating the webpages viewed by the user, text selected by the user, text searched by the user, and browser functionality utilized by the user (such as a built-in option for searching a selected term using a default search engine). The tracker 111 can also store information indicating the user's browsing history, cookies, and bookmarks. For each application that the tracker 111 tracks, including the browser application 113, the tracker 111 can store information regarding the words displayed to the user. For example, the tracker 111 can store the terms displayed to a user through each webpage viewed in the browser application 113. This can be used later to determine which terms a user is likely to be familiar with.

The tracker 111 can also track user behavior through other applications, such as the email application 115. For example, the tracker 111 can store information regarding the terms presented to the user in each email received or read by the user, as well as terms that are selected and acted on by the user. For example, if the user selects a term, copies it, and then enters it into a search engine through the browser application 113, this information can be stored by the tracker 111 at a memory storage location on the user device 110. The tracker 111 can periodically upload this stored information, collectively referred to as tracked user behavior 121, to the management server 120 in order to avoid utilizing more device 110 memory than necessary.

The user device 110 can also store one or more ML models 117. The ML models 117 can be trained by the management server 120, as explained in more detail later in this disclosure. The user device 110 can additionally store a representation of known terms 119 previously searched by the user or that frequently appear to the user. An example form of this representation is the bag-of-words model, a simplifying representation used in natural language processing and information retrieval. The bag-of-words model transforms text into a bag of its words, disregarding grammar, word order, and stop words (words commonly filtered out before processing text, such as "the") but retaining multiplicity. The representation can therefore include information indicating how frequently a user views a particular word in text presented to the user. The known terms 119 can be generated by the management server 120 or the user device 110 and can be stored at either or both devices.

The management server 120 can be any type of device having a hardware-based processor and a memory storage. For example, the management server 120 can be a server or group of servers acting in concert with one another. The management server 120 can exercise management control over the user device 110, such as by providing compliance rules that a user device 110 must follow and specifying remedial actions to be taken if the user device 110 does not comply with those rules. In some examples, the management server 120 can provision to the user device 110 an agent, such as the tracker 111, that can be used to gather information from the device 110 and carry out instructions received from the management server 120.

The management server 120 can store tracked user behavior 121 received from one or more user devices 110. The tracked user behavior 121, or portions thereof, can be used as input into an ML training service 123 that executes at the management server 120. In some examples, the management server 120 can use tracked user behavior 121 from multiple users as input to the ML training service 123. In other examples, the management server 120 can train customized ML models 125 by using the tracked user behavior 121 from a single user as input to the ML training service 123. The ML training service 123 can train the ML model 125 using any available ML training technique.

The ML training service 123 can train ML models 125 to predict which terms a user is likely to search to obtain additional information. The ML models 125 can be further trained to predict which search medium a user will utilize to search a particular term. The ML models 125 can account for any variable included in the tracked user behavior 121, such as the terms themselves, the source of the term (such as a particular document, email, or website), and the search mediums historically used for the term. When provided with a new body of text from a given source, the trained ML model 125 can identify and rank terms within the body of text that are most likely to be searched by the user, and for each of those terms can identify and rank search mediums most likely to be utilized by the user for the associated term. In this way, the ML model 125 can provide output that is not only specific to each user, but also specific to the term and source of the term.

The management server 120 can also store a representation of known terms 127 at the management server 120. The representation of known terms 127 can be created based on analyzing the tracked user behavior 121. In one example, the known terms 127 are generated at the management server 120 and then provided to the user device 110 for more immediate access. The management server 120 can update the known terms 127 as additional tracked user behavior 121 is received. The management server 120 can periodically provide an updated set of known terms 127 to the user device 110, either based on a predetermined time period or in accordance with an update of the known terms 127.

The system of FIG. 1 can also include a backend server 130. A backend server 130 can be a server or group of servers that supports one or more backend services. In some examples, the backend server 130 supports an application such as a third-party application or website that can be accessed on the user device 110. By way of example, the backend server 130 can support a SALESFORCE, CONCUR, or JIRA system.

In some examples, a user can search a backend system, including one or more backend servers 130, to determine the meaning of a particular term that he or she encounters within text. A user can receive an email asking for a particular type of report, for example, and then search a backend system for that report using the same term presented in the email. If this search is performed within an application related to that backend system for which the tracker 111 does not have tracking access, then the search might not make it into the tracked user behavior 121. But the backend server 130 can provide this tracking information, sending it to the management server 120 with an indication of the user performing the search and the term searched, as well as any other relevant information. The management server 120 can then incorporate this information into the stored tracked user behavior 121, using it for training ML models.

Figure 2:
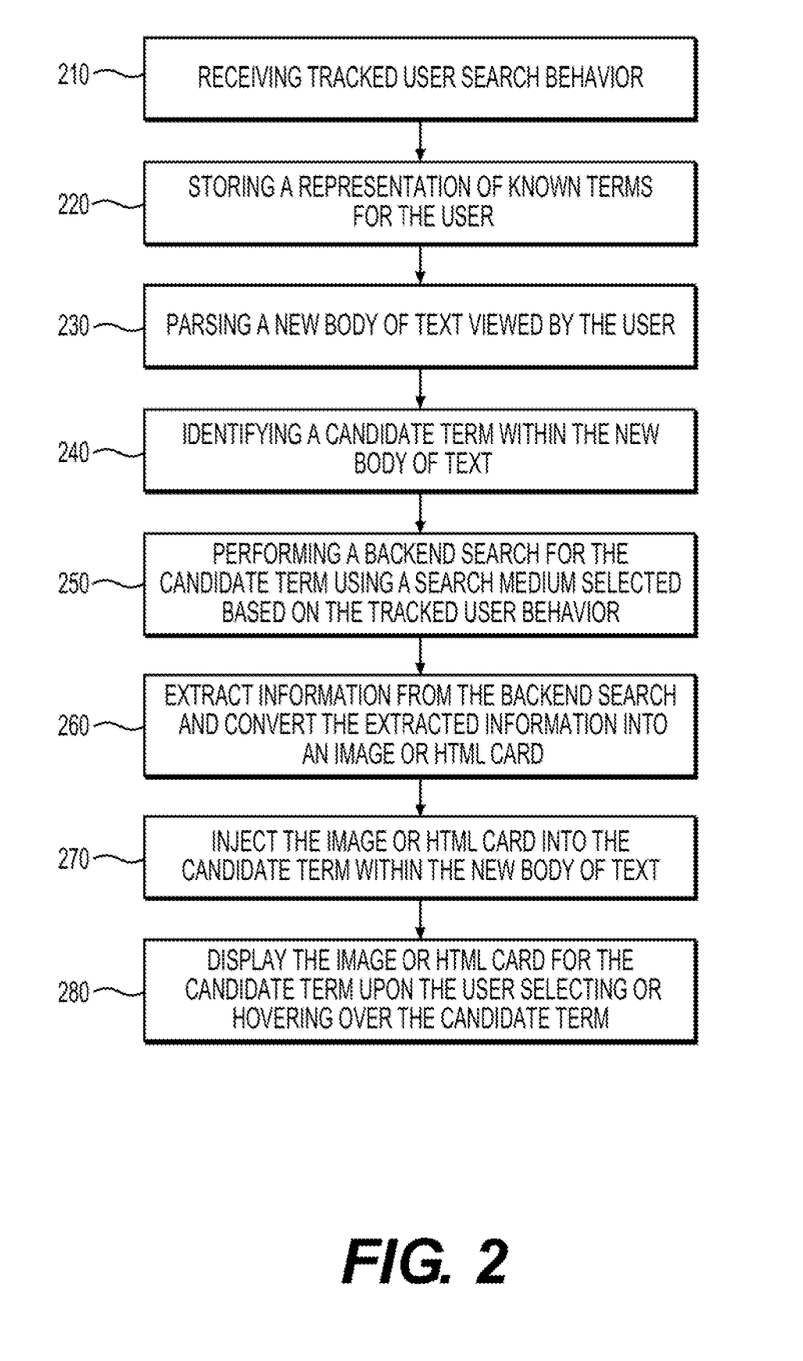
FIG. 2 is a flowchart of an example method for providing user-specific previews for terms within text.

FIG. 2 provides a flowchart of an example method for providing user-specific previews for terms within text. The example method can be performed by the system of FIG. 1, for example. Stage 210 of the method can include receiving tracked user search behavior, also referred to as tracked user behavior 121 in FIG. 1. The tracked user behavior 121 can be received at a management server 120 from a user device 110, a backend server 130, or both. For example, a tracker 111 on the user device 110 can gather user behavior data across a variety of applications, including browsers 113, email applications 115, text-editing applications, and content repository applications. The backend server 130 can gather user behavior data provided through a backend service associated with an application, such as a third-party application. User behavior data can also include all text viewed by the user, regardless of whether the user interacted with the text. The various sources of user behavior data can be combined and stored as tracked user behavior 121.

Stage 220 can include storing a representation of known terms 127 for the user. The known terms 127 can include terms that a user is likely to already know and therefore is not likely to search. This can include terms that the user has previously searched, for example. But it can also include terms that frequently appear to the user but are not searched. As an example, a user that frequently reads financial websites can frequently encounter terms such as "stop loss," "calls," "puts," "straddles," "margin call," and "earnings report." Regardless of whether the user interacts with these terms, the fact that they have been presented numerous times to the user can indicate that the user is likely to be familiar with these terms. Based on this frequency of appearances, these terms can be included in the known terms 127.

As explained above, the representation of known terms 127 can be in any format, such as a bag-of-words model. The representation of known terms 127 can therefore disregard grammar, word order, and stop words but retain the frequency information for each term. Additionally, the representation can include information regarding which words a user has searched in the past. For example, the representation of known terms 127 can include information about the specific words that the user selected and searched, the search engine used to search each of those words, and the source of the text, such as the particular website, application, or document in which the words appeared. This information can be used in future steps to avoid showing the user information about a word that is already familiar to the user and to select personalized content for the user. The representation of known terms 119, 127 can be stored at the user device 110 or at the management server 120, or both. In some examples, the management server 120 can generate the representation of known terms 127 and provide it to the user device 110 at regular intervals or when a change is made to the stored representation of known terms 127.

Stage 230 can include parsing a new body of text viewed by the user. For example, this stage can be performed based on the user device 110 detecting that the user is presented with a body of text. This can occur when a user opens an email, loads a webpage within a browser 113, or opens a document, for example. Based on the detection, the user device 110 can determine whether the text is currently searchable. If it is not, then the user device 110 can perform text recognition, such as optical character recognition ("OCR"), to make the text searchable. The user device 110 can then extract the terms from the text for further processing. This stage can be performed by the user device 110 or by the management server 120, such as by sending the body of the text to the management server 120 for processing.

Stage 240 can include identifying, by the user device 110 or the management server 120, depending on the example, a candidate term within the new body of text. To identify a candidate terms, the user device 110 can eliminate stop words or other commonly known terms from the parsed text. For example, words such as "a," "an," "the," "when," "because," "here," and other common words can be omitted from consideration. Further filtering can be performed by eliminating words included in the representation of known terms 119, such the terms "stop loss," "calls," "puts," "straddles," "margin call," and "earnings report" that the user may have searched for or frequently encountered, as explained with respect to stage 220. After these filtering stages, the remaining terms within the body of text can be considered candidate terms.

In some examples, this stage can include applying an ML model 117 to rank the candidate terms based on the likelihood of the user searching each candidate term. The ML model 117 can consider all relevant inputs regarding the body of text and individual candidate terms, such as the source of the text or time of day that the user is viewing the text, as examples. The ML model 117 can output a ranked order of candidate terms, either for all candidate terms or for a group of top terms, such as the top five or ten candidate terms. In some examples, the ML model 117 can output probability information, such as a probability of each term being searched by the user. The probability information can indicate when a large gap exists between candidate terms, such as when the top three candidate terms are more than 50% likely to be searched, while all remaining candidate terms are all less than 20% likely to be searched.

Stage 250 can include performing a backend search for the candidate term. The term "backend search" is intended to imply a search that is not performed on the front end by the user. That is, a backend search is performed in the background. The term backed search is not intended to necessary require the use of the backend server 130, for example.

The search at stage 250 can be performed using a search medium selected based on the tracked user behavior. For example, for a candidate term identified at stage 240, such as "iron condor," can be searched using an investment search engine, such as the search engine provided at www.investopedia.com. The investment search engine can be identified by an ML model 117 based on the user's previous history of searching complex options strategies using the investment search engine. This candidate term and search medium are merely exemplary, and any type of candidate term and associated search medium could be used at this stage.

Stage 260 can include extracting information from the backend search and converting it into an image or preview card, such as a hyper-text markup language ("HTML") card. For example, the search can initially retrieve a web page discussing the candidate term. The text on the web page can be used as additional input to an ML model 117 that isolates the most relevant portion of the web page. In the example of the candidate term "iron condor," the ML model 117 can isolate a definition that states "An iron condor is an options strategy created with four options consisting of two puts (one long and one short) and two calls (one long and one short), and four strike prices, all with the same expiration date."

In some examples, this text is isolated by creating a screenshot of the web page. In another example, this text is used to generate an image that includes the text. In yet another example, this text is injected into code that corresponds to a preview card. In some examples, the search and generation of the image or card is performed at the user device 110, while in other examples these actions are performed at the management server 120. In an example where they are performed at the management server 120, the management server 120 can then provide the generated image or card to the user device 110 for further use in later stages.

Stage 270 can include injecting the image or preview card generated at stage 260 into the candidate term within the new body of text. This can include running a script that changes the display of the candidate term within the new body of text. For example, the candidate term can be displayed in a manner that distinguishes it from other terms within the body of text, such as a different color, a different font, underlined, italicized, circled, boxed, or highlighted. The injecting at stage 270 can be performed by the user device 110 in some examples, but in other examples can be performed by the management server 110 and then transmitted to the user device 110 for display.

The code can specify that when a user interacts with the candidate term, such as by selecting the term or hovering a cursor over the term or an icon associated with the term, the image or card associated with that term is displayed. For example, stage 280 can include displaying the image or card in response to the user interacting with the candidate term. On a user device 110 that accepts user interaction through physical touching of the screen, interacting with the candidate term can include touching the candidate term or an icon displayed proximate the candidate term, such as a question mark icon. On a user device 110 that provides cursor functionality, such as a device running a desktop-grade operating system, interacting with the candidate term can include hovering a cursor on or near the candidate term or an icon displayed proximate the candidate term.

Stage 280 can include displaying a window on top of the body of text, such as in the foreground in front of the body of text. The window can include at least the image or preview card generated at stage 260. In some examples, and as discussed in more detail with respect to FIGS. 4A-4D, the window can include tabs and additional elements for user interaction, such as a mechanism for collecting user feedback.

Figure 3:
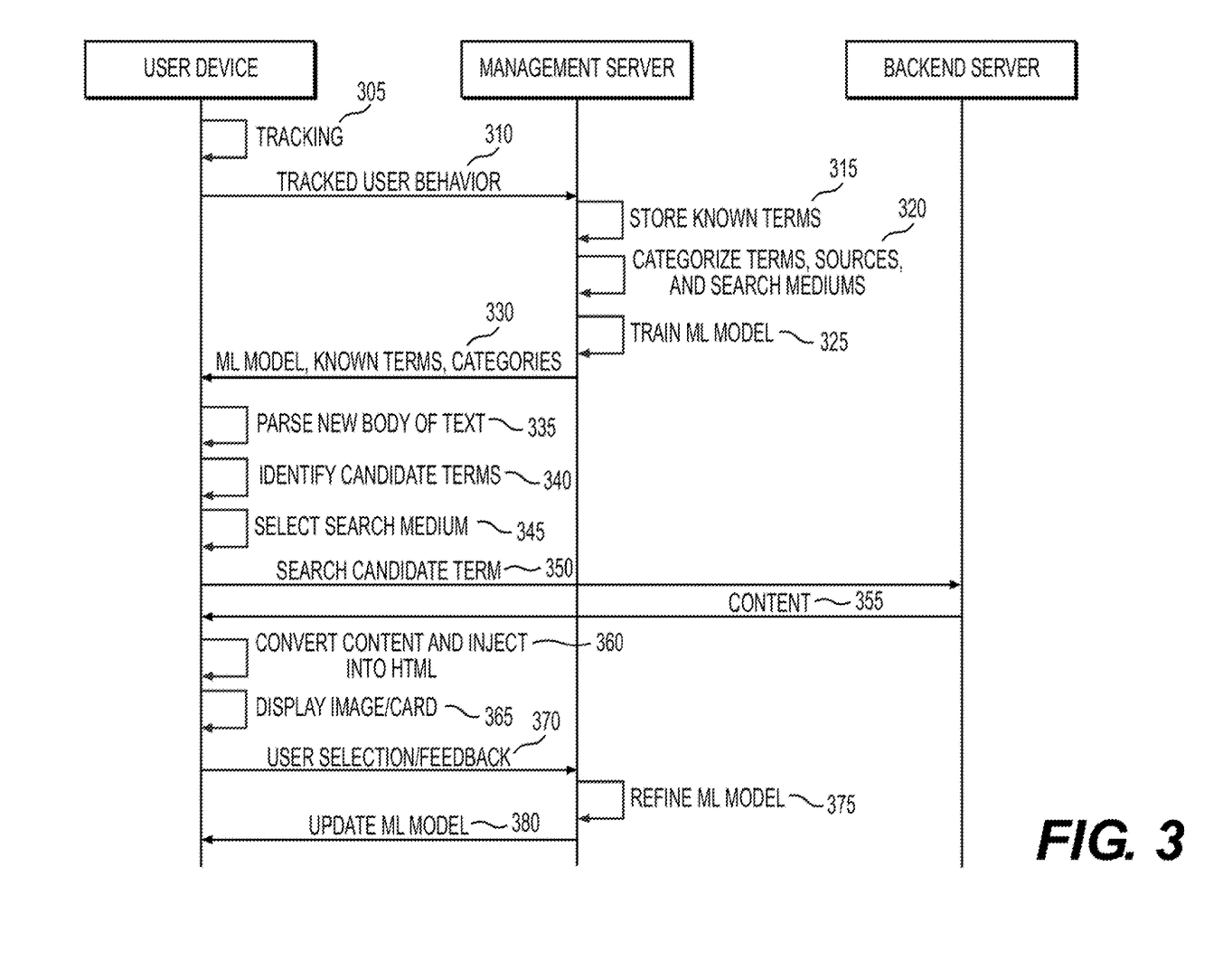
FIG. 3 is a sequence diagram of an example method for providing user-specific previews for terms within text.

FIG. 3 provides a sequence diagram of an example method for providing user-specific previews for terms within text. Stage 305 can include tracking user behavior at the user device 110, such as by utilizing a tracker 111. As explained, the tracker 111 can track user behavior on the user device 110 in a variety of ways. For example, with respect to the browser application 113, the tracker 111 can store information indicating the webpages viewed by the user, text selected by the user, text searched by the user, and browser functionality utilized by the user (such as a built-in option for searching a selected term using a default search engine). The tracker 111 can also store information indicating the user's browsing history, cookies, and bookmarks. For each application that the tracker 111 tracks, including the browser application 113, the tracker 111 can store information regarding the words displayed to the user. For example, the tracker 111 can store the terms displayed to a user through each webpage viewed in the browser application 113. This can be used later to determine which terms a user is likely to be familiar with.

The tracker 111 can also track user behavior through other applications, such as the email application 115. For example, the tracker 111 can store information regarding the terms presented to the user in each email received or read by the user, as well as terms that are selected and acted on by the user. For example, if the user selects a term, copies it, and then enters it into a search engine through the browser application 113, this information can be stored by the tracker 111 at a memory storage location on the user device 110. The tracker 111 can periodically upload this stored information, collectively referred to as tracked user behavior 121, to the management server 120 in order to avoid utilizing more device 110 memory than necessary. This upload can occur at stage 310 of the example method.

At stage 315, the management server 120 can store a representation of known terms 127. The indication of known terms 127 can be created based on analyzing the tracked user behavior 121. The known terms 127 can include terms that a user is likely to already know and therefore is not likely to search. This can include terms that the user has previously searched, for example. But it can also include terms that frequently appear to the user but are not searched. As an example, a user that frequently reads financial websites can frequently encounter terms such as "stop loss," "calls," "puts," "straddles," "margin call," and "earnings report." Regardless of whether the user interacts with these terms, the fact that they have been presented numerous times to the user can indicate that the user is likely to be familiar with these terms. Based on this frequency of appearances, these terms can be included in the known terms 127.

As explained above, the representation of known terms 127 can be in any format, such as a bag-of-words model. The representation of known terms 127 can therefore disregard grammar, word order, and stop words but retain the frequency information for each term. Additionally, the representation can include information regarding which words a user has searched in the past. For example, the representation of known terms 127 can include information about the specific words that the user selected and searched, the search engine used to search each of those words, and the source of the text, such as the particular website, application, or document in which the words appeared. The management server 120 can update the known terms 127 as additional tracked user behavior 121 is received.

At stage 320, the management server 120 can categorize terms, sources, and search mediums. Each term in the representation of known terms 127, can be assigned to one or more categories. For example, the term "iron condor" can be assigned to an "investment" or "financial" category, or both. Similarly, the term "nonobvious" can be assigned to a "patent" or "legal" category, or both. As another example, the term "bipartisan" can be assigned to a "politics" category.

The sources of each term can also be categorized independently of the categorization of each term. For example, if the term "iron condor" was received by the user device 110 within the body of an email, the source for that term can be categorized as "email." In some examples, a further category can be assigned based on the sender or other recipients of an email. For example, an email from within the user's department can be assigned to a category reflecting that department, while an email from a shopping website can be categorized as an advertisement email. As another example, if the term "bipartisan" was received by the user device 110 by displaying a news website, the source can be categorized as "news."

The search mediums utilized by a user can also be categorized at this stage. For example, the representation of known terms 127 can include an indication of not only which terms were searched by the user, but which search mediums were used to search those terms. As an example, if the term "iron condor" was searched by the user on www-.investopedia.com, that source can be categorized as an investment/financial search engine. If the term "bipartisan" was searched on www.google.com, the source can be categorized as a general search engine. If the term "progress report" was searched within a JIRA application, the source can be categorized as a backend application or as JIRA.

These categorizations can be stored at the management server 120 and used to train one or more ML models 125 at stage 325. For example, the tracked user behavior 121, including the representation of known terms 127 and associated categories, can be provided as training data to an ML training service 123 executing at the management server 120 or at a separate server dedicated to training ML models 125. The ML model 125 can therefore be trained to recognize patterns among the types of terms a user generally searches for, how those terms are initially presented to the user, and which search medium the user would utilize to search for a given type of term. In this way, an ML model 125 can be trained for a particular user, such that each user can be associated with a different, customized ML model 125.

At stage 330, the trained ML model 125, representation of known terms 127, and determined categories can be provided to the user device 110. The user device 110 can utilize these tools for analyzing text in further stages.

At stage 335, the user device 110 can parse a new body of text presented to the user. In this example, "new" can mean a body of text that has not been viewed by the user before, or at least within a certain period of time like the last year. This stage can be performed based on the user device 110 detecting that the user is presented with a body of text. This can occur when a user opens an email, loads a webpage within a browser 113, or opens a document, for example. Based on the detection, the user device 110 can determine whether the text is currently searchable. If it is not, then the user device 110 can perform text recognition, such as OCR, to make the text searchable. The user device 110 can then extract the terms from the text for further processing.

At stage 340, the user device 110 can identify one or more candidate terms within the new body of text. To identify a candidate terms, the user device 110 can eliminate stop words or other commonly known terms from the parsed text. For example, words such as "a," "an," "the," "when," "because," "here," and other common words can be omitted from consideration. Further filtering can be performed by eliminating words included in the representation of known terms 119, such the terms "stop loss," "calls," "puts," "straddles," "margin call," and "earnings report" that the user may have searched for or frequently encountered, as explained with respect to stage 220. After these filtering stages, the remaining terms within the body of text can be considered candidate terms.

In some examples, this stage can include applying an ML model 117 to rank the candidate terms based on the likelihood of the user searching each candidate term. The ML model 117 can consider all relevant inputs regarding the body of text and individual candidate terms, such as the source of the text or time of day that the user is viewing the text, as examples. The ML model 117 can output a ranked ordered of candidate terms, either for all candidate terms or for a group of top terms, such as the top five or ten candidate terms. In some examples, the ML model 117 can output probability information, such as a probability of each term being searched by the user. The probability information can indicate when a large gap exists between candidate terms, such as when the top three candidate terms are more than 50% likely to be searched, while all remaining candidate terms are all less than 20% likely to be searched.

At stage 345, the user device 110 can select a search medium for performing a search on a candidate term. This selection can be performed based on output from an ML model 117, such as a ranking of potential search mediums and associated probabilities that the user would utilize each search medium. For example, for a candidate term identified at stage 340, such as "ford mustang," can be searched using a search engine built into an automotive website, such as www.cars.com. The car search engine can be identified by an ML model 117 based on the user's previous history of searching for vehicles using that particular car-related search engine. In another example, the user device 110 can select a backend system such as SALESFORCE to perform the search, based on a term corresponding to a customer's new product.

At stage 350, the user device 110 can search the candidate term using one or more of the search mediums identified at stage 345. In one example, the search is performed for the top two search mediums most likely to be utilized by the user for a particular candidate term. The search can be performed by the user device 110 itself in some examples, while in other examples the user device 110 can request that the management server 120 or a backend server 130 perform the search. Additionally, some combination of these search mechanisms can be used.

In one example, the user device 110 performs a first search for a candidate term using a general-purpose search engine, such as www.google.com, through a browser application 113 on the user device 110. The top result of that search can be selected for use in further stages of the method. Additionally, the user device 110 can interface with a backend server 130 to perform a search on the same candidate term. This can be performed in various way. In one example, the user device 110 executes a backend application that includes search functionality, where the search functionality causes the backend server 130 to perform a search at the server and return results through the application. In another example, the user device 110 sends an instruction to the backend server 130 to perform the search and the backend server 130 returns the resulting content from the search at stage 355.

At stage 360, the user device 110 can convert the content resulting from any of the searches performed at stage 350. The content can be converted into an image or HTML, for example, though any particular format can be used. In some examples, the results from each separate search are converted into separate images or HMTL items. Although FIG. 3 shows this conversion being performed by the user device 110, it can also be performed by the management server 120 and be transmitted to the user device 110.

Stage 360 can also include injecting the converted content into the new body of text being displayed to the user. This can further include modifying the text such that the candidate term is displayed in a manner that distinguishes it from other terms within the body of text, such as a different color, a different font, underlined, italicized, circled, boxed, or highlighted. In some examples, an icon is placed proximate the candidate term to distinguish it from other terms.

When a user interacts with the candidate term, such as by selecting the term or hovering a cursor over the term or an icon associated with the term, the image or card associated with that term can be displayed at stage 365. On a user device 110 that accepts user interaction through physical touching of the screen, interacting with the candidate term can include touching the candidate term or an icon displayed proximate the candidate term, such as a question mark icon. On a user device 110 that provides cursor functionality, such as a device running a desktop-grade operating system, interacting with the candidate term can include hovering a cursor on or near the candidate term or an icon displayed proximate the candidate term.

This stage can include displaying a window on top of the body of text, such as in the foreground in front of the body of text. The window can include at least the image or preview card generated at stage 360. In some examples, and as discussed in more detail with respect to FIGS. 4A-4D, the window can include tabs and additional elements for user interaction, such as a mechanism for collecting user feedback.

At stage 370, the user can provide feedback for improving the system, such as by selecting an element indicating that the card is or is not helpful to the user. Additionally, the user's interaction with the card itself, such as by clicking through multiple tabs or copying information from the card, can be utilized as feedback information. The feedback information can be provided to the management server 120 at stage 370. At stage 375, the management server 120 can feed this information to the ML training service 123 to further train and refine the ML model 125 associated with the user at issue. The ML training service 123 can generate a refined ML model 125 and provide it to the user device 110 at stage 380 for use in future methods.

FIGS. 4A-4D provide illustrations of an example GUI 400 of a user device 110 used to provide user-specific previews for terms within text. In these examples, the GUI 400 is intended to depict an email application 115 executing on the user device 110, although the same functionality shown here can be equally applied to any other text displayed on the user device 110, including in a browser application 113, a text document, or any other body of text that can be displayed on the device 110. The email application includes a toolbar 420 displayed at the bottom of the application, providing various icons for performing actions such as creating a new email, deleting the current email, or archiving the current email.

Figure 4A:
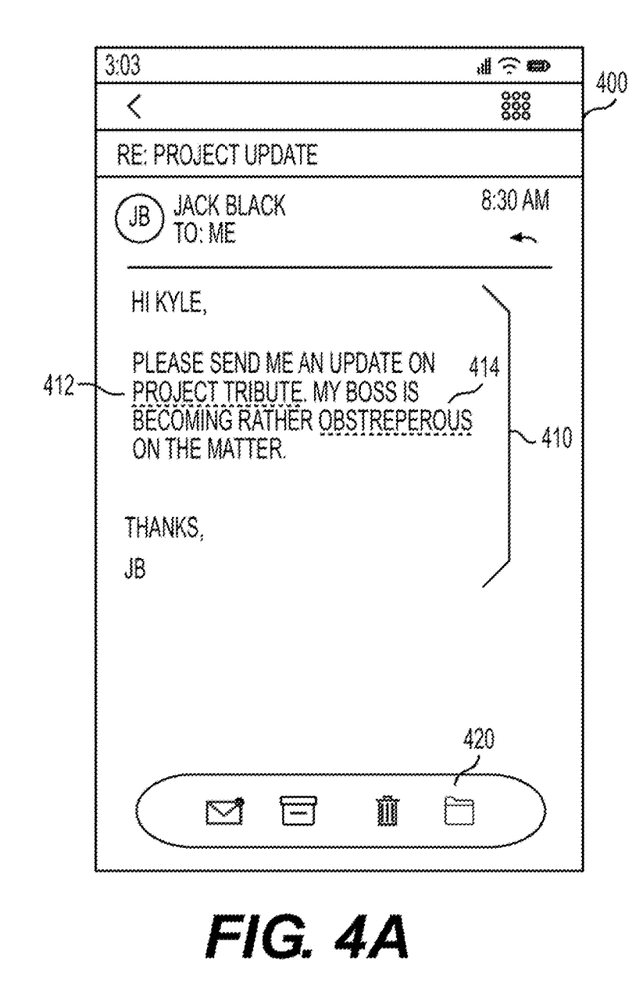
FIG. 4A is an illustration of an example GUI of a user device used to provide user-specific previews for terms within text.

The GUI 400 of FIG. 4A shows an email received by the user from another user, Jack Black, at 8:30 AM and titled "Re: Project Tribute." The email includes an email body 410 that includes text which can be considered the new body of text, as that phrase is used herein. In this example, the email body 410 includes two candidate terms 412, 414 that are being displayed so as to distinguish them from other terms in the email body 410. In this example, the terms 412, 414 are displayed with a dotted line underneath them.

Figure 4B:
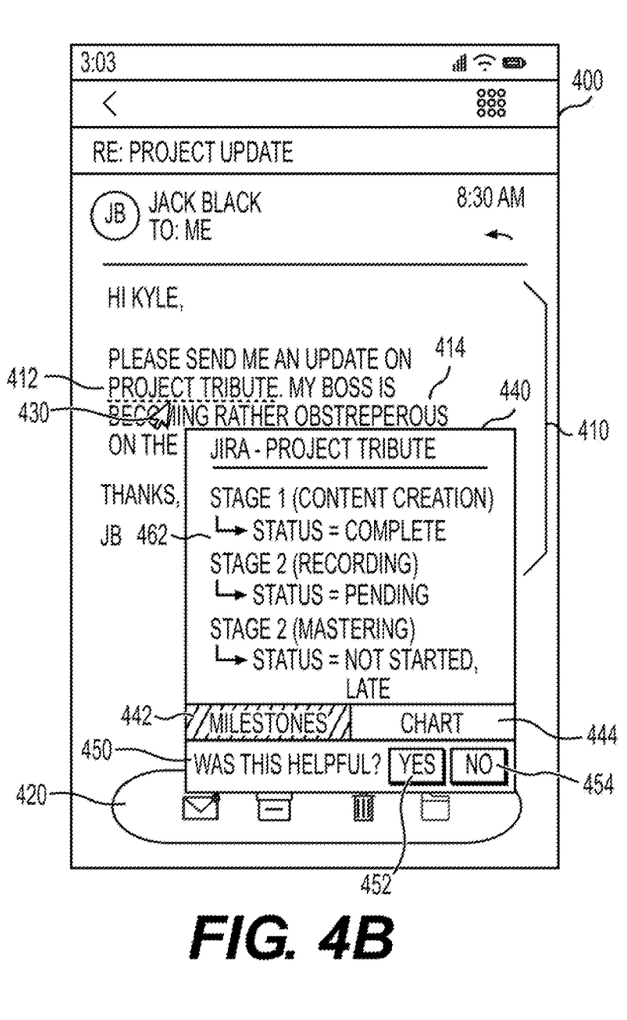
FIG. 4B is an illustration of an example GUI of a user device showing a user-specific preview for a term within text.

FIG. 4B provides an illustration of the GUI 400 when a user touches or clicks a term 412 or hovers a cursor 430 over the term 412. In this example, a cursor 430 is shown such as what would be used on a desktop operating system in conjunction with a mouse. However, cursor 430 is also intended to represent a touch interaction by a user on a touch screen of the user device 110, such as would be expected with a mobile-device operating system. In this example, the term 412 is "project tribute," which corresponds to a project associated with a backend system such as JIRA.

In response to the user interaction with the term 412, the user device 110 can perform the various methods described previously to generate and display a card 440 on the GUI 400. The card 400 can be displayed in the foreground of the application. In this example, the card 440 includes two tabs 442, 444, with the first tab 442 labeled as "Milestones" and the second tab 444 labeled as "chart." FIG. 4B shows the card 440 displaying the first tab 442, and accordingly that tab is shaded or can be otherwise visually distinguished as being selected. In this example, the first tab 442 corresponds to first content 462, which is content retrieved from a backend server 130 associated with the JIRA system. For example, first content 462 includes various stages of Project Tribute and a current status for each.

The card 440 also includes a feedback question 450, asking the user whether the card was helpful and providing a yes element 452 and no element 454 for providing the feedback. As mentioned, the feedback can be used to file the relevant ML model for that particular user.

Figure 4C:
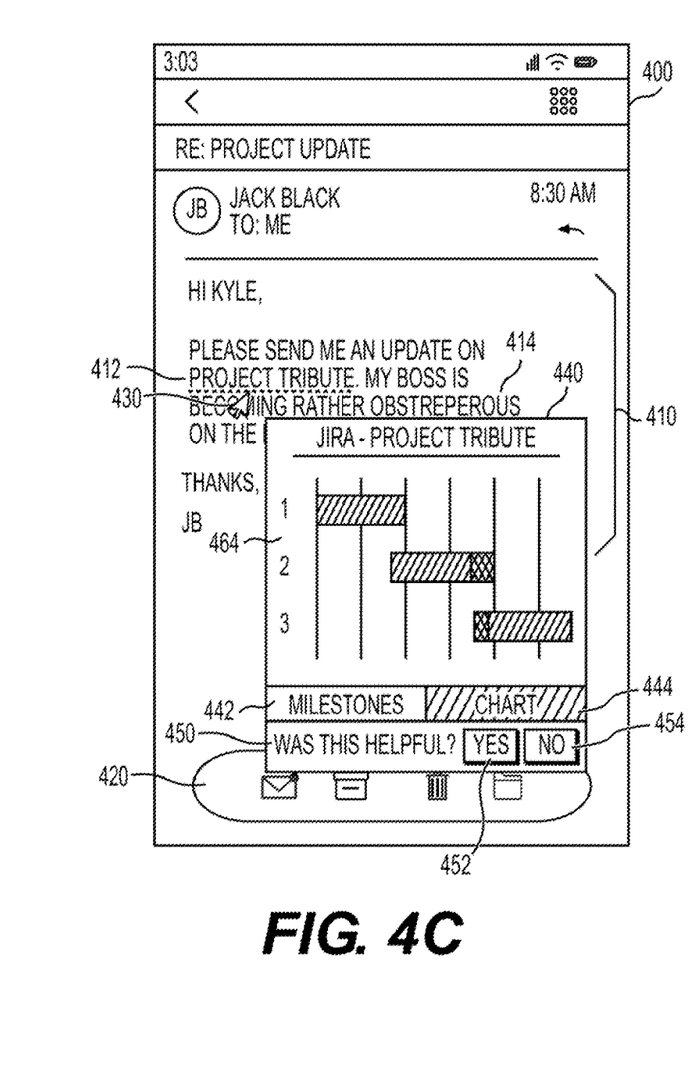
FIG. 4C is an illustration of an example GUI of a user device showing a user-specific preview for a term within text.

With the card 440 displayed as shown in FIG. 4B, the user can select the second tab 444. The resultant card 440 display is shown in FIG. 4C, where the second tab 444 is shown shaded. The card 440 now displays second content 464, also retrieved from the backend server 130, which in this example is a project management chart showing visual representations of project progress.

Figure 4D:
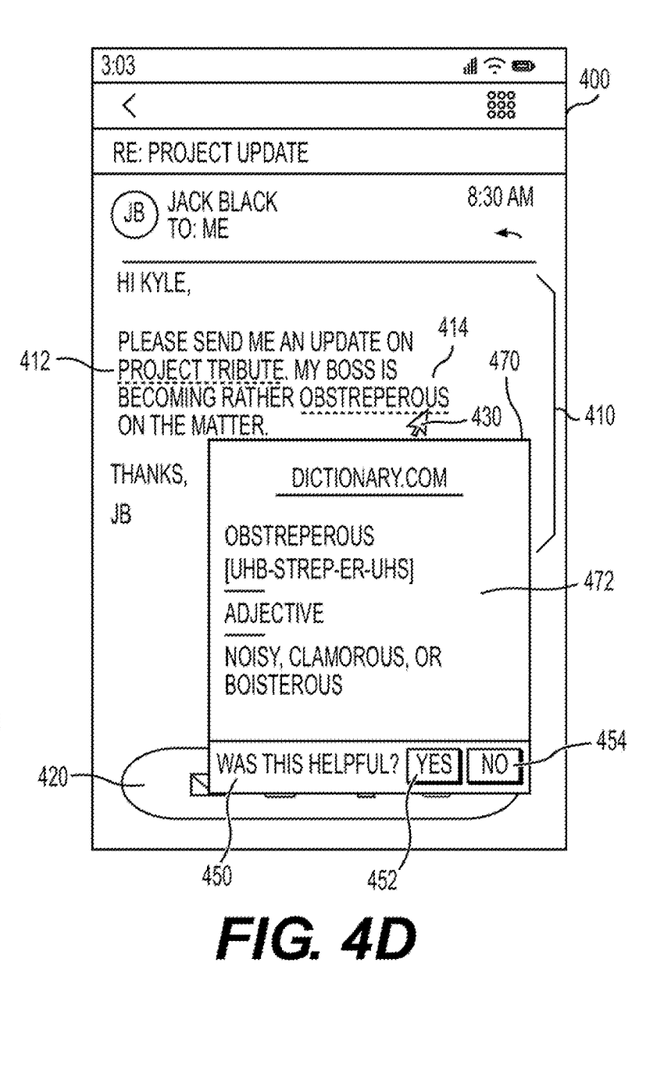
FIG. 4D is an illustration of an example GUI of a user device showing a user-specific preview for a term within text.

In some examples, the card 440 can include an element for closing the card, while in other examples the user can select a portion of the GUI 400 outside the card 440 or simply move a cursor away from the first term 412 in order to close the card 440. FIG. 4C shows an example where the user has selected, clicked, or hovered over a second term 414, which in this case is the word "obstreperous." As a result of performing various stages described previously, the user device 110 can display a second card 470, as shown in FIG. 4D. The second card 470 can include information obtained through a browser from a website, in this case www.dictionary.com. The second card 470 can include third content 472 associated with the content of the website, which in this example is a definition and pronunciation guide for the second term 414.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing user-specific previews for terms within text, comprising:
   sending, from a user device to a management server, tracked user search behavior, wherein the user search behavior indicates a term selected by a user from of a body of text and entered into a search;
   receiving, at the user device from the management server:
      a representation of known terms previously searched by the user or frequently appearing to the user;
      term categories that categorize terms selected by the user;
      source categories that categorize sources of texts containing the terms selected by the user;
      search-medium categories that categorize the search mediums utilized by the user to search the terms selected by the user; and
      a machine-learning model trained at the management server using the tracked user search behavior;
   parsing, by the user device, a new body of text viewed by the user;
   identifying a candidate term within the new body of text by excluding stop words and terms matching the known terms in the stored representation;
   predicting a search medium most likely to be used by the user to search for the candidate term, wherein the predicting is performed at the user device by implementing the machine-learning model using the term categories, source categories, and search-medium categories;
   performing a backend search for the candidate term using a search medium selected based on the tracked user search behavior;
   extracting information from the backend search and converting the extracted information into an image or preview card;
   injecting the image or preview card into the candidate term within the new body of text; and
   displaying the image or preview card for the candidate term upon the user selecting or hovering over the candidate term.

2. The method of claim 1, wherein the machine-learning model outputs an identification of the search medium most likely to be utilized by the user to search the candidate term.

3. The method of claim 1, further comprising displaying multiple images or preview cards for the candidate term, wherein each of the multiple images or preview cards is retrieved from a different search medium.

4. The method of claim 1, further comprising determining that the tracked user search behavior indicates that the user searches for terms with at least a threshold frequency.

5. The method of claim 1, wherein identifying a candidate term further comprises ranking a plurality of potential candidate terms and selecting the candidate term based on the ranking.

6. The method of claim 1, wherein displaying the image or preview card further comprises displaying a feedback element allowing a user to indicate whether the displayed image or preview card is helpful to the user.

7. The method of claim 1, wherein the new body of text is at least a portion of an email displayed within an email client.

8. A non-transitory, computer-readable medium containing instructions that, when executed by a hardware-based processor, performs stages for providing user-specific previews for terms within text, the stages comprising:
   sending, from a user device to a management server, tracked user search behavior, wherein the user search behavior indicates a term selected by a user from of a body of text and entered into a search;
   receiving, at the user device from the management server:
      a representation of known terms previously searched by the user or frequently appearing to the user;
      term categories that categorize terms selected by the user;
      source categories that categorize sources of texts containing the terms selected by the user;
      search-medium categories that categorize the search mediums utilized by the user to search the terms selected by the user; and
      a machine-learning model trained at the management server using the tracked user search behavior;
   parsing, by the user device, a new body of text viewed by the user;
   identifying a candidate term within the new body of text by excluding stop words and terms matching the known terms in the stored representation;
   predicting a search medium most likely to be used by the user to search for the candidate term, wherein the predicting is performed at the user device by implementing the machine-learning model using the term categories, source categories, and search-medium categories;
   performing a backend search for the candidate term using a search medium selected based on the tracked user search behavior;
   extracting information from the backend search and converting the extracted information into an image or preview card;
   injecting the image or preview card into the candidate term within the new body of text; and
   displaying the image or preview card for the candidate term upon the user selecting or hovering over the candidate term.

9. The non-transitory, computer-readable medium of claim 8, wherein the machine-learning model outputs an identification of the search medium most likely to be utilized by the user to search the candidate term.

10. The non-transitory, computer-readable medium of claim 8, the stages further comprising displaying multiple images or preview cards for the candidate term, wherein each of the multiple images or preview cards is retrieved from a different search medium.

11. The non-transitory, computer-readable medium of claim 8, the stages further comprising determining that the tracked user search behavior indicates that the user searches for terms with at least a threshold frequency.

12. The non-transitory, computer-readable medium of claim 8, wherein identifying a candidate term further comprises ranking a plurality of potential candidate terms and selecting the candidate term based on the ranking.

13. The non-transitory, computer-readable medium of claim 8, wherein displaying the image or preview card further comprises displaying a feedback element allowing a user to indicate whether the displayed image or preview card is helpful to the user.

14. The non-transitory, computer-readable medium of claim 8, wherein the new body of text is at least a portion of an email displayed within an email client.

15. A system for providing user-specific previews for terms within text, comprising:
   a memory storage including a non-transitory, computer-readable medium comprising instructions; and
   a computing device including a hardware-based processor that executes the instructions to carry out stages comprising:
      sending, from the computing device to a management server, tracked user search behavior, wherein the user search behavior indicates a term selected by a user from of a body of text and entered into a search;
      receiving, at the computing device from the management server:
         a representation of known terms previously searched by the user or frequently appearing to the user;
         term categories that categorize terms selected by the user;
         source categories that categorize sources of texts containing the terms selected by the user;
         search-medium categories that categorize the search mediums utilized by the user to search the terms selected by the user; and
         a machine-learning model trained at the management server using the tracked user search behavior;
      parsing, by the computing device, a new body of text viewed by the user;
      identifying a candidate term within the new body of text by excluding stop words and terms matching the known terms in the stored representation;
      predicting a search medium most likely to be used by the user to search for the candidate term, wherein the predicting is performed at the computing device by implementing the machine-learning model using the term categories, source categories, and search-medium categories;
      performing a backend search for the candidate term using a search medium selected based on the tracked user search behavior;
      extracting information from the backend search and converting the extracted information into an image or preview card;
      injecting the image or preview card into the candidate term within the new body of text; and
      displaying the image or preview card for the candidate term upon the user selecting or hovering over the candidate term.

16. The system of claim 15, wherein the machine-learning model outputs an identification of the search medium most likely to be utilized by the user to search the candidate term.

17. The system of claim 15, the stages further comprising displaying multiple images or preview cards for the candidate term, wherein each of the multiple images or preview cards is retrieved from a different search medium.

18. The system of claim 15, the stages further comprising determining that the tracked user search behavior indicates that the user searches for terms with at least a threshold frequency.

19. The system of claim 15, wherein identifying a candidate term further comprises ranking a plurality of potential candidate terms and selecting the candidate term based on the ranking.

20. The system of claim 15, wherein displaying the image or preview card further comprises displaying a feedback element allowing a user to indicate whether the displayed image or preview card is helpful to the user.

\* \* \* \* \*